(12) United States Patent
Ait Aoudia et al.

(10) Patent No.: US 12,040,857 B2
(45) Date of Patent: Jul. 16, 2024

(54) RECEIVER FOR A COMMUNICATION SYSTEM

(71) Applicant: Nokia Technologies Oy, Espoo (FI)

(72) Inventors: Faycal Ait Aoudia, Saint-Cloud (FR); Mathieu Goutay, Paris (FR); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 21 days.

(21) Appl. No.: 17/795,620

(22) PCT Filed: Jan. 29, 2020

(86) PCT No.: PCT/EP2020/052103
§ 371 (c)(1),
(2) Date: Jul. 27, 2022

(87) PCT Pub. No.: WO2021/151477
PCT Pub. Date: Aug. 5, 2021

(65) Prior Publication Data
US 2023/0078979 A1 Mar. 16, 2023

(51) Int. Cl.
*H04B 7/0456* (2017.01)
*H04L 25/03* (2006.01)
(52) U.S. Cl.
CPC ..... *H04B 7/0456* (2013.01); *H04L 25/03006* (2013.01); *H04L 2025/03426* (2013.01)
(58) Field of Classification Search
CPC ... H04L 1/0045; H04L 1/0047; H04L 1/0036; H04L 25/0254; H04L 27/2649; H04L 25/03006; H04L 2025/03426; H04B 7/0413; H04B 1/06; H04B 7/0456; G06N 3/02; G06N 3/08; G06N 3/045
See application file for complete search history.

(56) References Cited

U.S. PATENT DOCUMENTS

| | | | |
|---|---|---|---|
| 8,184,726 B2 * | 5/2012 | Hsiao | H04B 7/0617 375/267 |
| 10,192,327 B1 * | 1/2019 | Toderici | G06V 10/82 |
| 10,305,766 B1 | 5/2019 | Zhang et al. | 455/456.1 |
| 10,498,486 B1 | 12/2019 | Stopler et al. | |

(Continued)

FOREIGN PATENT DOCUMENTS

| | | |
|---|---|---|
| CN | 101030800 A | 9/2007 |
| CN | 108462517 A | 8/2018 |

(Continued)

*Primary Examiner* — Sophia Vlahos
(74) *Attorney, Agent, or Firm* — Joseph C. Drish; Harrington & Smith

(57) ABSTRACT

The present subject matter relates to a receiver including a detector for receiving a signal from a transmitter. The detector includes a set of one or more settable parameters, and circuitry configured for implementing an algorithm having trainable parameters. The algorithm is configured to receive as input information indicative of a status of a communication channel between the transmitter and the receiver and to output values of the set of settable parameters of the detector. The detector is configured to receive a signal corresponding to a message sent by the transmitter and to provide an output indicative of the message based on the received signal and the output values of the set of settable parameters of the detector.

18 Claims, 6 Drawing Sheets

(56) References Cited

U.S. PATENT DOCUMENTS

| | | | | |
|---|---|---|---|---|
| 10,771,122 B1* | 9/2020 | Pasad | ................ | H04L 25/03019 |
| 10,833,785 B1* | 11/2020 | O'Shea | ................ | H04B 17/373 |
| 11,271,634 B2* | 3/2022 | Mao | ........................ | G06F 17/18 |
| 11,405,243 B2* | 8/2022 | Gomony | ................ | G06N 3/045 |
| 2015/0358055 A1 | 12/2015 | Moliseh et al. | ................... | 7/452 |
| 2018/0367192 A1* | 12/2018 | O'Shea | .................... | G06N 3/08 |
| 2019/0274108 A1* | 9/2019 | O'Shea | ............. | H04W 72/0453 |

FOREIGN PATENT DOCUMENTS

| | | | | |
|---|---|---|---|---|
| CN | 110719239 A | 1/2020 | | |
| WO | WO 2010/019618 A2 | 2/2010 | | |
| WO | WO-2018/233932 A1 | 12/2018 | | |
| WO | WO-2019/080988 A1 | 5/2019 | | |
| WO | WO 2020/015840 A1 | 1/2020 | | |
| WO | WO-2020239232 A1 * | 12/2020 | .............. | G06N 3/084 |

* cited by examiner

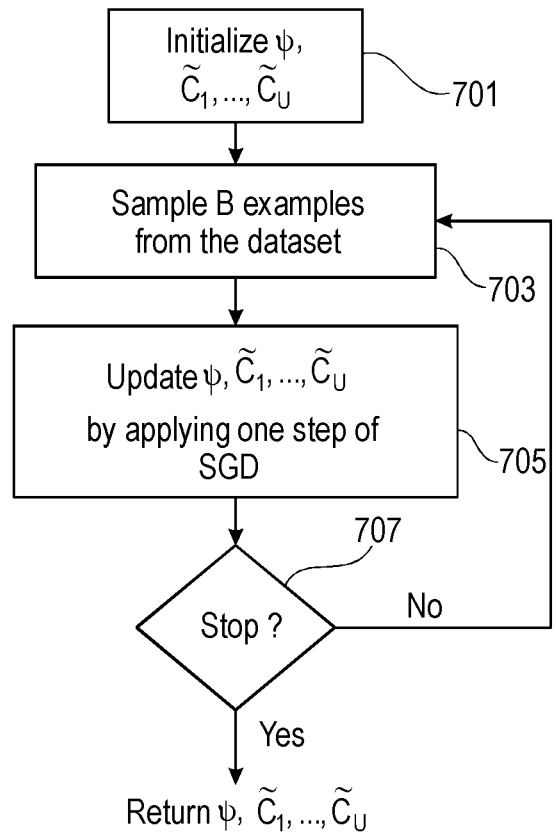
Fig. 7
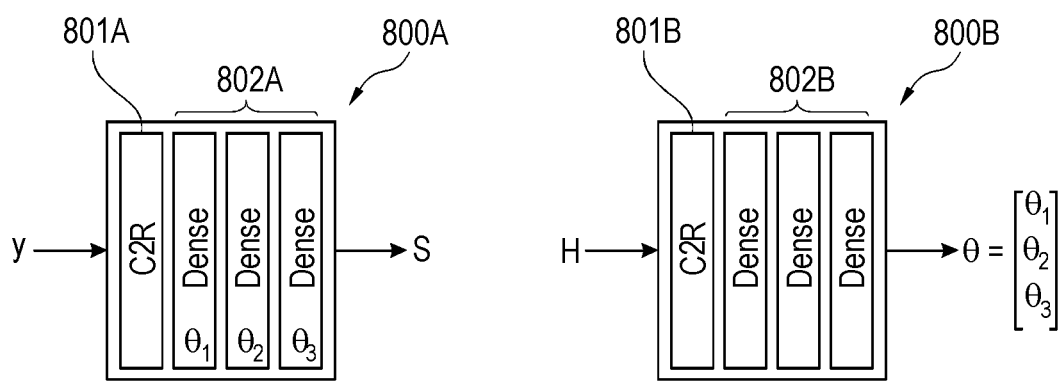
Fig. 8A
Fig. 8B

RECEIVER FOR A COMMUNICATION SYSTEM

CROSS REFERENCE TO RELATED APPLICATION

This patent application is a U.S. National Stage application of International Patent Application Number PCT/EP2020/052103 filed Jan. 29, 2020, which is hereby incorporated by reference in its entirety.

TECHNICAL FIELD

Various example embodiments relate to computer networking, and more particularly to a receiver for a communication system.

BACKGROUND

Communication systems such as Multiple Input/Multiple Output (MIMO) systems are known systems which use multiple antennas at the transmitter and receiver along with advanced digital signal processing to improve link quality and capacity. More data can be received and sent where there are more antenna elements. However, there is a need to further improve the performance of the data communication in such communication systems.

SUMMARY

Example embodiments provide a receiver comprising a detector for receiving a signal from at least one transmitter. The detector comprises a set of one or more settable parameters, and means for implementing an algorithm having trainable parameters. The algorithm is configured to receive, as input, information indicative of a status of a communication channel between the at least one transmitter and the receiver and to output values of the set of settable parameters of the detector. The detector is configured to receive a signal corresponding to a message sent by the at least one transmitter and to provide an output indicative of the message based on the received signal and the output values of the set of settable parameters of the detector.

According to further example embodiments, a method comprises: providing an algorithm having trainable parameters that is configured to receive as input information indicative of a status of a communication channel between at least one transmitter and a receiver and to output values of a set of one or more settable parameters of a detector, receiving a signal at the receiver, in response to inputting the information to the algorithm, receiving from the algorithm values of the set of settable parameters, inputting the received signal and the values of the set of settable parameters to the detector for receiving an output indicative of a message transmitted to the receiver.

According to further example embodiments, a computer program product comprises instructions stored thereon for causing an apparatus for performing at least the following: providing an algorithm having trainable parameters that is configured to receive as input information indicative of a status of a communication channel between at least one transmitter and the apparatus and to output values of a set of one or more settable parameters of a detector of the apparatus, receiving a signal at the apparatus, in response to inputting the information to the algorithm, receiving from the algorithm values of the set of settable parameters, inputting the received signal and the values of the set of settable parameters to the detector for receiving an output indicative of a message transmitted to the apparatus.

According to further example embodiments, a system comprises a receiver and at least one transmitter. The receiver comprises a detector for receiving a signal from the at least one transmitter. The detector comprises a set of one or more settable parameters, and means for implementing an algorithm having trainable parameters. The algorithm is configured to receive, as input, information indicative of a status of a communication channel between the at least one transmitter and the receiver and to output values of the set of settable parameters of the detector. The detector is configured to receive a signal corresponding to a message sent by the at least one transmitter and to provide an output indicative of the message based on the received signal and the output values of the set of settable parameters of the detector.

BRIEF DESCRIPTION OF THE DRAWINGS

The accompanying figures are included to provide a further understanding of examples, and are incorporated in and constitute part of this specification. In the figures:

FIG. 7 is a flowchart of a method for training an algorithm in accordance with an example of the present subject matter;

FIG. 8A is a block diagram of an example implementation of a demodulator described with reference to FIG. 2;

FIG. 8B is a block diagram of an example implementation of an algorithm or a machine learning model described with reference to FIG. 1 and FIG. 2 respectively;

DETAILED DESCRIPTION

Figure 1:
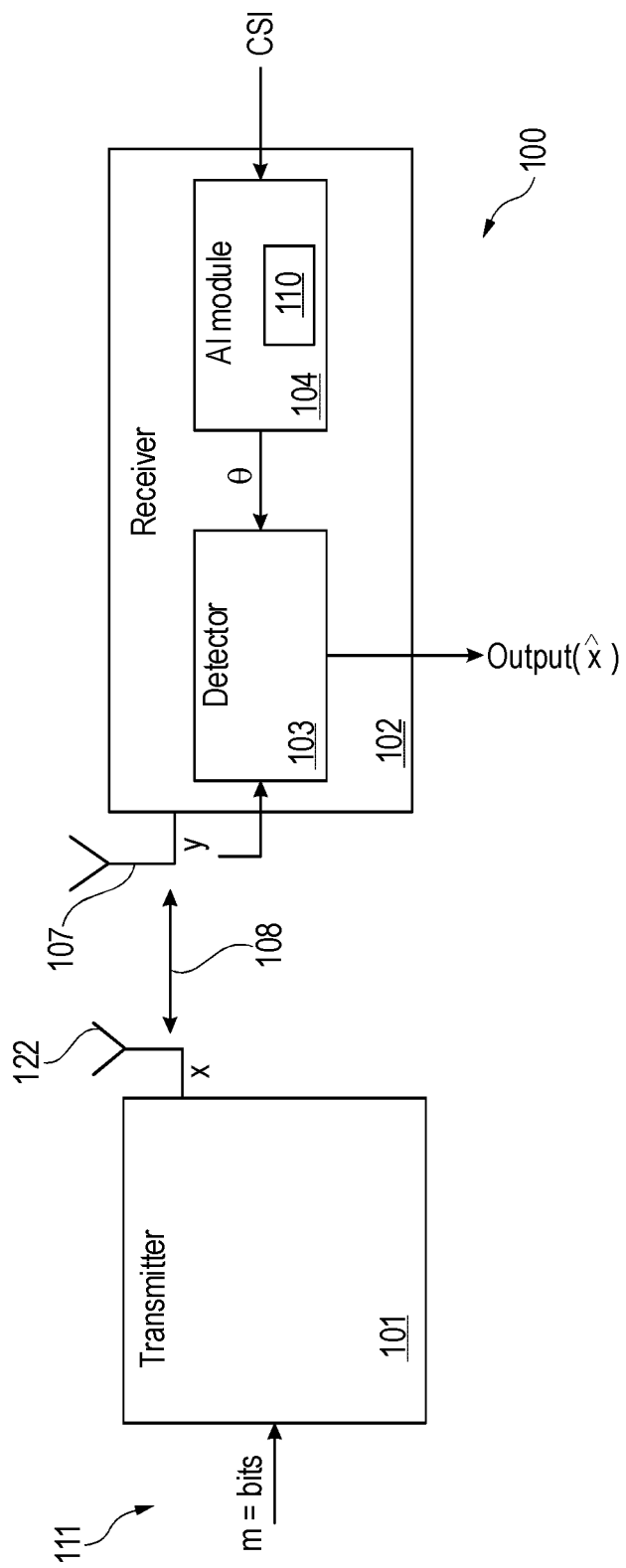
FIG. 1 depicts a diagram of a communication system in accordance with an example of the present subject matter.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The trainable parameters are parameters of the algorithm. The term "algorithm having trainable parameters" or "algorithm with trainable parameters" may be a trained algorithm whose parameters have values, wherein the values are obtained by training the algorithm.

The communication channel between the at least one transmitter and the receiver may have a status or a state. The status of the communication channel may vary over time. The status of the communication channel may be described by one or more properties of the communication channel. A property of the properties of the communication channel may, for example, comprise a channel gain, a channel phase, a SNR, a received signal strength indication (RSSI) or a transfer matrix etc. The communication channel may be established via a single-input and single-output (SISO), multiple-input and single-output (MISO) or a multiple-input and multiple-output (MIMO) system.

The information indicating the status of the communication channel may, for example, be channel state information (CSI) of the communication channel. This information describes how a signal propagates from the at least one transmitter to the receiver and represents the combined effect of, for example, scattering, fading, and power decay with distance. The information may comprise values of one or more attributes, wherein each attribute has attribute values indicating a respective property of the communication channel.

The detector may be a device or a circuit that extracts information from a received signal. The extracted information may be indicative of a transmitted message or symbol. The received signal may be a modulated radio frequency (RF) current or voltage. The modulation may be performed using a predefined modulation scheme. The received signal may, for example, correspond to a message transmitted by the at least one transmitter. The message may be a data unit that contains a sequence of bits. Each bit of the sequence of bits may have a binary value (e.g., 1 or 0). The extraction of information by the detector may, for example, be performed in accordance with said modulation scheme.

The settable parameters of the detector are parameters. A settable parameter of the settable parameters may be a matrix, a vector or a scalar. The settable parameters may be set to values. The settable parameters of the detector may have values that are optimized or generated for a given status of the communication channel. In case the status of the communication channel changes, the settable parameters may be assigned different values representing a new status of the communication channel. The present subject matter may be configured to automatically adapt the values of the settable parameters to the communication channel conditions.

In one example, the at least one transmitter may be a single transmitter. The transmitter may, for example, comprise at least one transmitting antenna and the receiver may comprise at least one receiving antenna. In one example, the transmitter may comprise multiple transmitting antennas and the receiver may comprise multiple receiving antennas, wherein the communication channel may be a MIMO channel.

In one example, the at least one transmitter may be multiple transmitters, wherein the message is received from the multiple transmitters. Each transmitter of the multiple transmitters may have a transmitting antenna.

The received signal may comprise a sample received by each receiving antenna of the receiver e.g. the received signal may comprise a vector of samples.

The present subject matter may enable an accurate recovery of transmitted messages by the at least one transmitter. The present subject matter may automatically adapt a message recovery process to changing conditions of the communication channel. This may enable to achieve a reliable communication.

According to an example, the detector is configured to implement an iterative message recovery algorithm or a neural network. The iterative message recovery algorithm may be an iterative signal recovery algorithm. This embodiment may enable a seamless integration of the present subject matter with existing systems. For example, detectors of various complexity and reliability may be configured to receive values of their settable parameters and to provide their outputs in accordance with the present subject matter.

According to an example, the values of the set of one or more settable parameters are shared between iterations of the iterative message recovery algorithm. By sharing the set of parameters between the iterations, the receiver may compute a single set of values of the set of parameters, which may significantly reduce its complexity and increase the efficiency of the receiver. This may also save processing resources while still achieving an accurate recovery of the transmitted message. In particular, the resources that would otherwise be required for providing the set of parameters for the remaining iterations may be saved.

According to an example, the set of settable parameters of the detector is divided into a number of vectors of a first dimension j, wherein the algorithm having trainable parameters is configured to output an equal number of embedding vectors of a second dimension r. The second dimension is smaller than the first dimension, wherein the algorithm is configured to generate the values for the settable parameters from the plurality of embedding vectors using a trainable matrix of dimension j×r. For example, the difference (j−r) between the dimensions r and j may be higher than a predefined threshold. The threshold may, for example, be user defined.

For example, the set of settable parameters θ may be divided into D vectors $\theta'_{d, d \in \{1, \ldots, D\}}$ of equal dimension j. $\theta'_{d, d \in \{1, \ldots, D\}}$ would be the settable parameters of the D iterations of the iterative message recovery algorithm. As with weights sharing, complexity may further be reduced by implementing an algorithm that outputs D embedding vectors $Y_{d, d \in \{1, \ldots, D\}}$ of a same dimension r that is much smaller than the dimension of $\theta'_d$. Each $\theta'_{d, d \in \{1, \ldots, D\}}$ may be generated by the product $\theta'_d = \Omega \gamma_d$, where $\Omega$ is the trainable matrix of dimension j×r. Using a single matrix $\Omega$ may be advantageous because all the vectors $\theta'_d$ have the same dimension j.

According to an example, the iterative message recovery algorithm is any one of: an orthogonal approximate message passing network (OAMPNet) or a deep learning multiple-input and multiple-output detection scheme (MMNet). The operation of the detector in accordance with this embodiment may enable optimal performances compared to a simple feeding of the detector with the information such as a channel matrix H and without adapting the values of the settable parameters. This embodiment may further be advantageous as it may prevent a re-training of e.g. MMNet for each realization of the channel matrix H.

According to an example, the algorithm having trainable parameters is a trained machine learning model. This may enable an automated and accurate generation of the settable parameters. An accurate generation of the settable parameters may further increase the accuracy of the recovery of the transmitted message.

According to an example, the receiver comprises multiple receiving antennas, wherein the information is an estimate of a MIMO channel matrix. The message comprises multiple bit vectors each being transmitted with a respective transmitting antenna of the at least one transmitter, wherein the received signal may, for example, be a vector of received samples $y \in \mathbb{C}^N$ where N is number of receiving antennas.

The MIMO detection may be NP-hard and the complexity of demodulation may increase exponentially with the number of transmitters and the numbers of bits per channel use. The demodulation as enabled by this embodiment may provide a low-complexity solution because the demodulation may automatically be assisted by the algorithm having trainable parameters.

According to an example, the detector comprises a demodulator and a demapper. The demodulator is configured to provide a probability that a modulated symbol of the message is transmitted by a particular transmitting antenna of the multiple transmitting antenna given the received signal. The demapper is configured to provide a probability that each bit of the modulated symbol is set to one and transmitted by a particular transmitting antenna of the multiple transmitting antennas, wherein the provided output indicative of the message comprises anyone of the two probabilities. This embodiment may enable an efficient message recovery compared to a method taking a hard decision on symbols. The later method may have a lower efficiency because a subsequent application of a demapping to generate probabilities over bits may not be practical using the hard decisions.

According to an example, the method further comprises receiving a training set comprising triplet samples. Each triplet sample comprises a channel state information, a transmitted message and received signal. The method comprises training the algorithm using the training set and the detector, thereby generating the algorithm with values of the trainable parameters.

For example, the training may be performed in accordance with the following steps. The values of the set of settable parameters may first be predicted by the algorithm using the channel state information of a triplet sample, the detector may provide an output indicative of a recovered message based on the received signal of said triplet sample and the predicted values, and the provided output may be compared with the transmitted message of said triplet sample. Based on the comparison result, the values of the trainable parameters of the algorithm may be changed and the steps may be repeated for another triplet sample. The repetition may be performed until a stop criterion is met. The stop criterion may for example require that the training set is fully processed.

According to an example, the transmitter comprises multiple transmitting antennas and the receiver comprising multiple receiving antennas. The message comprises multiple bit vectors (U vectors) each having a respective size $k_u$ and each being transmitted by a respective transmitting antenna of the multiple transmitting antennas. The training is performed to obtain values of the trainable parameters $\Psi$ by optimizing a predefined loss function. The loss function is a binary cross entropy on transmitted bits or a categorical cross entropy on symbols.

According to an example, the at least one transmitter may be multiple transmitters, wherein the message is received from the multiple transmitters. Each transmitter of the multiple transmitters may have a transmitting antenna. The message comprises multiple bit vectors (U vectors) each having a respective size $k_u$ and each being transmitted by a respective transmitter of the multiple transmitters. The training is performed to obtain values of the trainable parameters $\Psi$ by optimizing a predefined loss function. The loss function is a binary cross entropy on transmitted bits or a categorical cross entropy on symbols.

In one example, the loss function may be defined as follows:

$$L(\psi) = -\frac{1}{B}\sum_{i=1}^{B}\sum_{u=1}^{U}\sum_{j=1}^{k_u}\left(b_{i,j}^{(i)}\log\left(p_{u,j}^{(i)}\right) + \left(1-b_{u,j}^{(i)}\right)\log\left(1-b_{u,j}^{(i)}\right)\right),$$

where $\psi_l$ is the $l^{th}$ element in the vector $\psi$, $p_{u,j}^{(i)}$ is the probability that the $j^{th}$ bit sent by the $u^{th}$ transmitting antenna of the multiple transmitting antennas is set to one for the $i^{th}$ training sample of the training set, $b_{u,j}^{(i)}$ is $j^{th}$ bit of the bit vector transmitted by the $u^{th}$ transmitting antenna, B is the number of sampled training samples of the training set.

In another example, the loss function may be defined as follows.

$$L(\psi) =$$
$$-\frac{1}{B}\sum_{i=1}^{B}\sum_{u=1}^{U}\sum_{j=1}^{k_u}\left(b_{i,j}^{(i)}\log\left(p_{u,j}^{(i)}\right) + \left(1-b_{u,j}^{(i)}\right)\log\left(1-b_{u,j}^{(i)}\right)\right) + \lambda\sum_{l=0}^{L-1}|\psi_l|,$$

where $\lambda$ is a tuning parameter. This loss function may be advantageous as it may reduce the complexity of the algorithm by enforcing a weight sparsity using an L1 regularization at the training. The L1 regularization adds a penalty term to the above loss function that drives parameters toward zero and is controlled by the tuning parameter $\lambda$.

According to an example, the training further provides values of trainable matrices ($\check{C}_1$) representing constellations of the at least one transmitter, thereby enabling a joint optimization of the receiver and the at least one transmitter. This embodiment may enable an end-to-end training that includes both the transmitter and the receiver ends of the communication system. This may further increase the accuracy of the provided values of the settable parameters.

FIG. 1 is a block diagram of a communication system 100 in accordance with an example of the present subject matter.

The communication system 100 comprises a transmitter 101 and a receiver 102. Each of the transmitter 101 and the receiver 102 may be an example of a wireless communication device. The receiver 102 may be referred to as and/or may include some or all of the functionality of a user equipment (UE), mobile station (MS), terminal, an access terminal, a subscriber unit, a station, etc. Examples of the receiver 100 include cellular phones, smartphones, personal digital assistants (PDAs), wireless devices, electronic automobile consoles, sensors, laptop computers, etc.

The transmitter 101 may receive a sequence of bits or a string of bits or a vector of bits 111. Each bit of the sequence of bits 111 may have a binary value (e.g., 0 or 1). The sequence of bits 111 may represent data to be transmitted. For example, the sequence of bits 111 may represent a message m. The message may comprise information obtained from voice calls, Internet traffic, control information, text messages, requests, etc. The sequence of bits 111 may have a rate (R) that may be expressed as bits per second. The transmitter 101 may generate modulated symbols x from the received sequence of bits 111 in accordance with a modulation scheme. For example, each symbol x may represent a predefine number of bits. The modulation scheme may, for example, be a quadrature amplitude modulation (QAM) scheme. The generated modulated symbols may be converted into RF signals which are then transmitted via one or more transmitting antennas 122 over a communication channel 108. The communication channel 108 may be established in accordance with a SISO, a MISO or a MIMO protocol.

The receiver 102 may receive a signal y corresponding to the message m from one or more receiving antennas 107. The received signal y may be a modulated signal in accordance with the modulation scheme. The receiver 102 may be configured to recover the transmitted message m from the received signal y. For that, the receiver 102 may include components as shown in FIG. 1. For example, the receiver may include a detector 103 and an artificial intelligence (AI) module 104. Each of the components may be implemented in hardware or in a combination of hardware and software. For example, the detector 103 and the AI module 104 may be implemented in hardware (e.g., circuitry) or in a combination of hardware and software (e.g., processor with instructions).

The detector 103 comprises a set of settable parameters $\theta(\theta_1, \theta_2 \ldots \theta_K)$. The set of settable parameters $\theta$ may, for example, be terms of one or more equations or of set of rules of a recovery model that is used by the detector 103 to recover the transmitted symbols x. The recovery model may be configured to perform the recovery depending on a state of the communication channel 108. That is, the set of settable parameters $\theta$ may be dependent on the state of the communication channel 108 e.g. the set of settable parameters may have different values for different CSIs of the communication channel 108. In addition to the settable parameters $\theta$, the recovery model may have other parameters such as the CSI of the communication channel 108. The recovery model may, for example, be a deep feedforward neural network (cf. FIG. 8A).

The values of the settable parameters $\theta$ may be determined or predicted by the AI module 104. For example, the AI module 104 may implement an algorithm 110 having trainable parameters $\Psi \in \mathbb{R}^L$ in order to predict the values of the settable parameters $\theta$ for a current state of the communication channel 108. The current state of the communication channel 108 may, for example, be a state of the communication channel 108 at the time of receiving the signal y. The algorithm 110 may, for example, be a trained algorithm. The algorithm may be trained to estimate or predict, from a CSI of the communication channel 108, the values of the set of settable parameters $\theta$. The algorithm 110 is configured to receive as input the CSI of the communication channel 108 and to output values of the set of settable parameters $\theta$. The set of settable parameters $\theta$ may be set to values predicted by the AI module 104.

Thus, based at least on the received signal y and the predicted values of the set of settable parameters $\theta$, the detector 103 may provide an output indicative of the message m.

Before setting the settable parameters to the predicted values, the set of settable parameters $\theta$ may or may not have assigned values. In one example, the set of settable parameters $\theta$ may have initial values. The initial values may, for example, be values obtained in accordance with the present subject matter e.g. for a previously received signal at the receiver 102. In another example, the initial values may be user defined values. The initial values may, for example, be associated with a given state of the communication channel 108 which may be different from the current state. By setting the set of parameters $\theta$ to predicted values representing the current state, a reoptimizing or retraining of the recovery model may be prevented.

Figure 2:
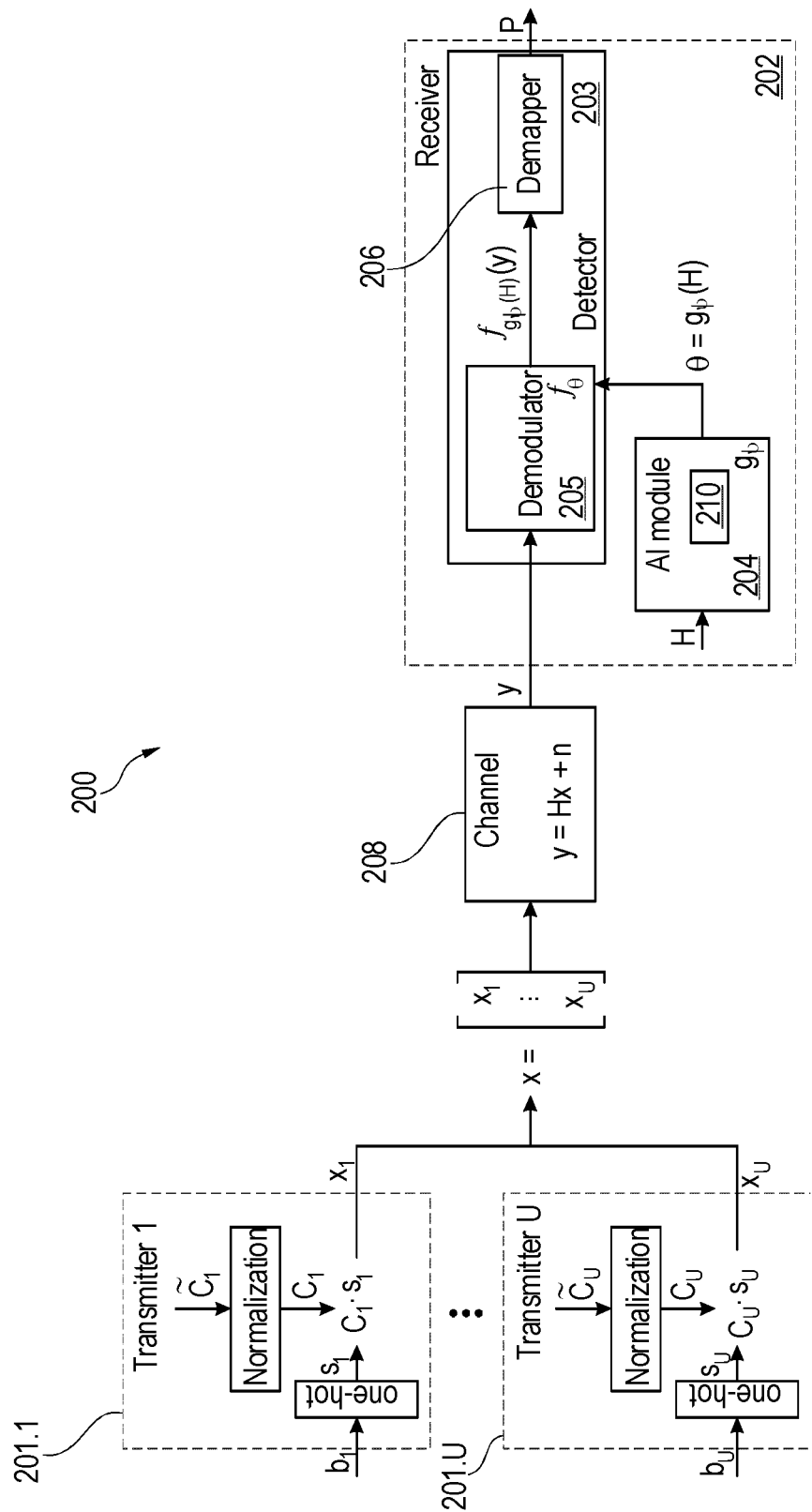
FIG. 2 depicts a diagram of a communication system in accordance with an example of the present subject matter.

FIG. 2 is a block diagram of a communication system 200 in accordance with an example of the present subject matter. The communication system 200 may utilize a MIMO communication method for exchanging data using multiple transmitting and receiving antennas.

For example, the communication system 200 may comprise multiple transmitters 201.1-U and a receiver 202. The multiple transmitters may, for example, be transmitters of respective terminals or user equipment, wherein each transmitter has a transmitting antenna. The receiver may, for example, be a receiver of a base station. Each transmitter 201.i (where i=1, 2 . . . or U) of the transmitters may receive an incoming bit vector $b_i \in \{0, 1\}^{k_i}$ which is converted to its one-hot representation $s_i$. The one-hot representation may be a vector of length $2^{k_i}$ for which all elements are set to 0 except the one which index has $b_i$ as binary representation is set to 1. A modulated symbol $x_i$ may be obtained by selecting a constellation point from a constellation $C_i$ (e.g., QAM constellation), and a labelling scheme (e.g., a Gray labelling scheme). The selection may be performed by the product of the one-hot representation $s_i$ and the constellation $C_i$, as shown in FIG. 2. The constellation $C_i$ may be obtained by a trainable matrix $\tilde{C}_i \in \mathbb{C}^{2^{k_i}}$, after being normalized, to ensure some energy constrained, e.g., $E\{|x|^2\}=1$. Each transmitter 201.i may be configured to transmit a respective symbol $x_i$ as described with reference to the transmitter 101 via a respective transmitting antenna of U transmitting antennas (not shown). For example, the modulated symbols $x=[x_1, \ldots, x_U]^T$ are transmitted over a MIMO channel 208.

The signal from each transmitting antenna is then received by the receiving antennas at the receiver 202. The path between each transmitting antenna and each receive antenna may be modelled by a transfer function and the overall channel transfer function of the system 200 may be formed from the combination of these transfer functions to define a function as follows: y=Hx+n, where $y \in \mathbb{C}^N$ is the vector of received samples (received signal), N is the number of receiving antennas (not shown) at the receiver, $H \in \mathbb{C}^{N \times U}$ is the channel matrix of the MIMO channel 208, and $n \in \mathbb{C}^N$ is the receiver noise.

At the receiver 202, the signals from each receiving antenna are extracted and the receiver uses an AI module 204 and a detector 203 to extract data indicative of the original transmission signals. For example, the receiver 202 may be configured to perform a MIMO detection for recovering the set of U bit vectors $b_1, \ldots, b_U, b_i \in \{0, 1\}^{k_i}$, where $i \in \{1, \ldots, U\}$, and $k_i$ is the number of bits per channel use for the $i^{th}$ transmitter. For that, the detector 203 comprises a demodulator 205 and a demapper 206. The demodulator 205 includes an algorithm with settable parameters (e.g., a neural network or an iterative signal recovery algorithm) which implement $\mathbb{R}^{\sum_{i=1}^{U} 2^{k_i}}$, mapping $f_\theta: y \in \mathbb{C}^N \mapsto S \in \mathbb{R}^{\sum_{i=1}^{U} 2^{k_i}}$, where $\theta \in \mathbb{R}^K$ is the vector of settable parameters of dimension K. The values of the set of settable parameters $\theta$ may be obtained from the AI module 204. For example, the AI module 204 may implement a trained machine learning (ML) model 210. The trained ML model 210 may be an example of the algorithm 110 having trainable parameters of FIG. 1. The trained ML model 210 implements the mapping $g_\psi: H \in \mathbb{C}^{N \times U} \mapsto \theta \in \mathbb{R}^K$ where $\psi \in \mathbb{R}^L$ is the vector of trainable parameters of the trained ML model. The trained ML model 210 may be configured to predict values of the set of settable parameters $\theta$ using as input the channel matrix H. However, in order to apply the channel matrix H, the receiver 202 may first estimate the channel matrix H. This may for example be done by sending a training signal which is known at the receiver or by using simulation data based on a model descriptive of the communication system 200. In another example, the ML model 210 may be trained to use as input an estimate of the signal-to-noise ratio (SNR) or the received signal strength indication (RSSI) in order to perform the predictions.

After setting the set of settable parameters θ to the predicted values, the demodulator 205 may perform a demodulation of the received samples y to compute probabilities over the transmitted symbols $p_i(x_j)$, which corresponds to the probability that the $i^{th}$ transmitter transmitted the symbol $x_j \in C_i$. All probabilities over the transmitted symbols can be written as follows: $S=\{p_i(x_j)\}_{(i,j)}$. Moreover, the symbol-wise probabilities $p_i(x_j)$ are fed to the demapper 206 which computes bit-wise probabilities $p_{i,j}$ over the transmitted bits. $p_{i,j}$ denotes the probability that the $j^{th}$ bit transmitted by the $i^{th}$ transmitter was set to 1, and P= $\{p_{i,j}\}_{(i,j)}$. The computation of the bit-wise probabilities from the symbol-wise probabilities $p_i(x_j)$ may be done as follows: $p_{i,j} = \Sigma_{x \in X_{i,j}} p_i(x)$, where $X_{i,j}$ is the set of all symbols $x \in C_i$ to which bit vectors $b \in \{0, 1\}^{k_i}$ with the $j^{th}$ bit set to 1 are mapped by the transmitter. These bit-wise probabilities may subsequently be fed to a channel decoder (e.g., belief propagation) to produce an estimate of transmitted bit vectors. In another example, the demapper 206 may compute bit-wise log likelihood ratios (LLRs) $l_{i,j}$ over the transmitted bits, where $$l_{i,j} = \frac{p_{i,j}}{1 - p_{i,j}}.$$

These LLRs may subsequently be fed to the channel decoder.

The number of receiving antennas N and the number of transmitting antennas U may be the same or may be different. For example, in case the number of receiving antennas N is higher than or equal to the number of transmitting antennas (N≥U), the signal recovery by the receiver 202 may be improved by leveraging the QR-decomposition of the channel matrix H. For example, matrices Q of size N×N and R of size U×U such that $$H = Q\begin{bmatrix} R \\ 0 \end{bmatrix}$$

are computed using the Gram—Schmidt algorithm, where Q is unitary and R is upper triangular. The coefficients of the matrix R are fed to the trained ML model 210 in order to predict values of the set of settable parameters. The values of the product Q*y are fed to the demodulator 205 instead of the received samples y, where Q* is the conjugate transpose of Q in order to compute the symbol-wise probabilities. In addition to leading to better performance, this approach may have the benefit of significantly reducing the number of inputs of the trained ML model 210. Moreover, the number of non-zero coefficients of the matrix R that are fed to the trained ML model 210 may only depend on the number of transmitters U, and is independent of the number of receiving antennas at the receiver. This approach may further be advantageous as the ML model 210 may be trained using matrices R of reduced sizes compared to the matrix H.

Although shown as separate components, the demodulator 205 and the demapper 206 may be implemented as a single component e.g. a single neural network that implements both the demodulator 205 and the demapper 206. With this approach, the function $f_\theta$ would output probabilities over the bits instead of probabilities over the symbols.

The system of FIG. 2 is provided for exemplification purpose and other example implementations may be used. For example, the system may be provided with multiple-antenna transmitters instead of single-antenna transmitters 201.1-U and/or with multiple channels instead of the single channel 208.

Figure 3:
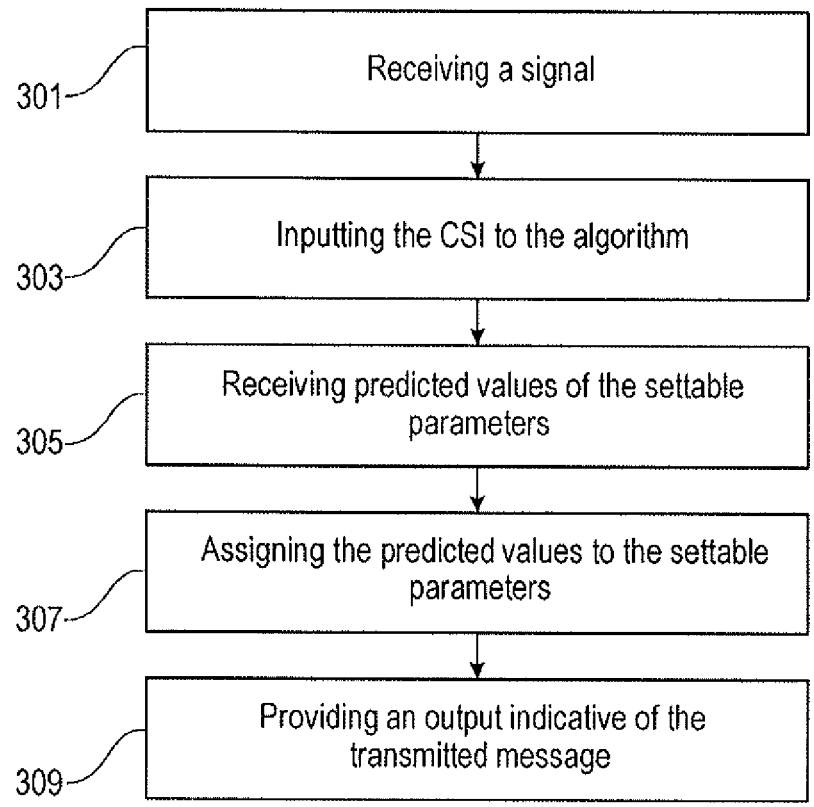
FIG. 3 is a flowchart of a method for data communication in accordance with an example of the present subject matter.

FIG. 3 is a flowchart of a method for data communication in accordance with an example of the present subject matter. The method shown in FIG. 3 will be discussed with regard to the deployment scenario shown in FIG. 1 for example purposes. However, example embodiments should not be limited to this example.

A signal may be received in step 301 at the receiver 102. The signal may be received via the communication channel 108, wherein the communication channel 108 has a given status. The received signal may correspond to a transmitted message by the transmitter 101. The received signal may be processed in order to recover the transmitted symbol of the message. For that, the AI module 104 may input in step 303 the information indicating the given status of the communication channel to the algorithm 110. The inputting step 3030 may be performed in response to receiving the signal.

In response to inputting the information on the given status of the communication channel to the algorithm 110, the AI module 104 may receive from the algorithm 110 in step 305 predicted values of the set of settable parameters θ. In step 307, the set of settable parameters may be assigned the predicated values.

Using the received signal and the predicted values of the set of settable parameters the detector 103 may provide in step 309 an output indicative of a message transmitted to the receiver. The output may for example comprise a recovered symbol.

The method steps 303 to 309 may be repeated for further receive signals. The method steps 303-309 may, for example, automatically be performed upon receiving a signal at the receiver 102.

Figure 4:
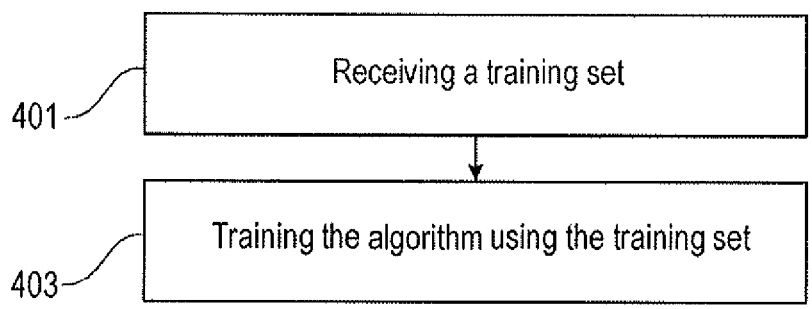
FIG. 4 is a flowchart of a method for training an algorithm in accordance with an example of the present subject matter.

FIG. 4 is a flowchart of a method for optimizing the values of the trainable parameters of the algorithm 110 in accordance with an example of the present subject matter. The method shown in FIG. 4 will be discussed with regard to the deployment scenario shown in FIG. 1 for example purposes. However, example embodiments should not be limited to this example.

In step 401, a training set may be received. The training set comprises multiple entries, wherein each entry comprises a tuple. Each tuple (H, m, y) comprises a channel state information such as a channel matrix H of the communication channel 108, a transmitted message m by the transmitter 101 and a received signal y by the receiver 102.

In step 403, the algorithm 110 may be trained using the received training set. For example, the training may be performed in accordance with the following steps. The values of the set of settable parameters may first be predicted by the algorithm 110 using the channel state information H1 of a tuple (H1, m1, y1), the detector may provide an output indicative of a recovered message based on the received signal y1 of the tuple (H1, m1, y1) and the predicted values, and the provided output may be compared with the transmitted message m1 of the tuple (H1, m1, y1). Based on the comparison result, the values of the trainable parameters of the algorithm 110 may be changed and the steps may be repeated for another tuple e.g. (H2, m2, y2). The repetition may be performed until a stop criterion is met. The stop criterion may for example require that the training set is fully processed. Further details of the training are described with reference to FIGS. 6 and 7.

Step 403 may, for example, be repeated on a periodic basis e.g. as soon as the training set is updated. And the retrained algorithm may, for example, be used instead of the trained algorithm e.g. in the method of FIG. 3, for performing signal recovery in accordance with the present subject matter.

Figure 5:
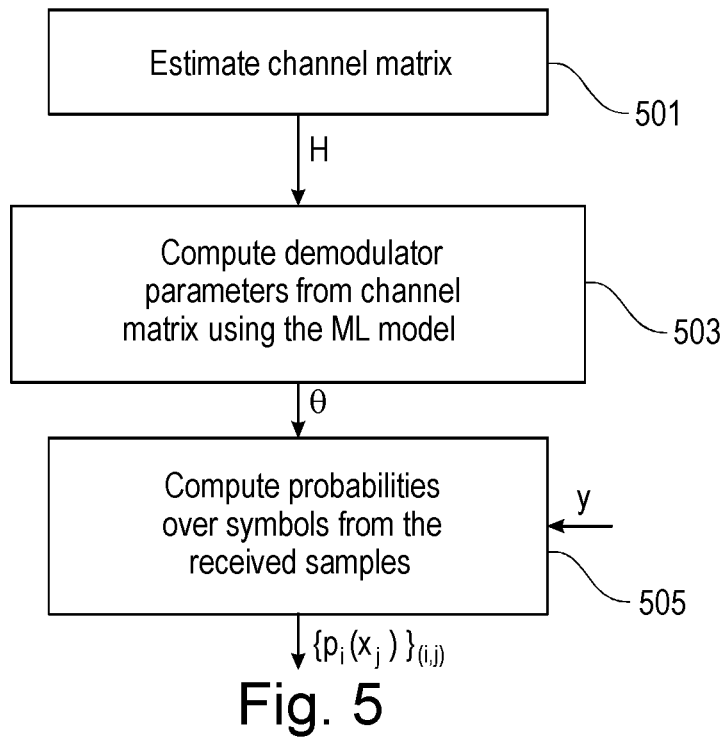
FIG. 5 is a flowchart of a method for data communication in accordance with an example of the present subject matter.

FIG. 5 is a flowchart of a method for data communication in a MIMO system in accordance with an example of the present subject matter. FIG. 5 will be discussed with regard to the deployment scenario shown in FIG. 2 for example purposes. However, example embodiments should not be limited to this example.

A channel matrix H may be estimated in step 501. The estimation of the channel matrix H may for example be performed using a linear minimum mean square error (LMMSE) estimator or least square (LSQ) method. The trained ML model 210 may be fed with the estimate of H to compute or predict in step 503 values of the set of settable parameters θ of the demodulator 205. In step 505, the set of settable parameters of the demodulator 205 may be set to the predicted values of the set settable parameters θ. In step 507, the demodulator 205 may be fed with the received samples y to compute probabilities over the symbols $p_i(x_j)$, which corresponds to the probability that the $i^{th}$ transmitter transmitted the symbol $x_j \in C_i$. All probabilities over the transmitted symbols can be written $\{p_i(x_j)\}_{(i,j)}$ as shown in FIG. 5.

Figure 6:
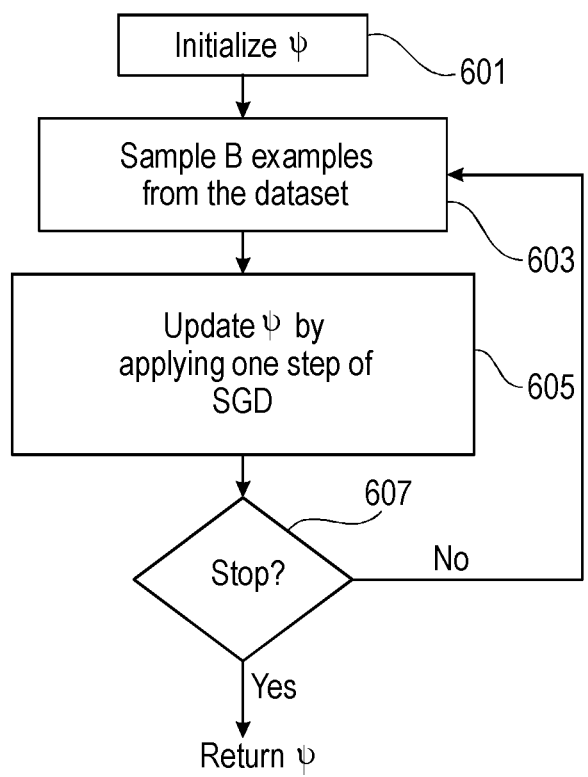
FIG. 6 is a flowchart of a method for training an algorithm in accordance with an example of the present subject matter.

FIG. 6 is a flowchart of a method for training an algorithm with trainable parameters such as the ML model 210 in accordance with an example of the present subject matter. FIG. 6 will be discussed with regard to the deployment scenario shown in FIG. 2 for example purposes. However, example embodiments should not be limited to this example.

For training the ML model 210, a system made by the demodulator 205 and the AI module 204 may be considered as a single component: $h = f_{g_\psi}$ with ψ are trainable parameters of the ML model 210. The training set may comprise entries $\{(H^{(i)}, y^{(i)}, b_1^{(i)}, \ldots, b_U^{(i)})\}_{i=1,\ldots,D}$ of size D, in which a training example (or training sample) consists of a channel matrix H, a vector of received samples y, and the transmitted bit vectors $b_1, \ldots, b_U$.

In step 601, the trainable parameters ψ may be initialized. The initialization may for example be performed randomly. In step 603, B training examples may be sampled from the training set. In step 605, the trainable parameters ψ may be updated by applying one step of stochastic gradient descent (SGD) on the following loss function:

$$L(\psi) = -\frac{1}{B} \sum_{i=1}^{B} \sum_{u=1}^{U} \sum_{j=1}^{k_u} \left( b_{i,j}^{(i)} \log\left(p_{u,j}^{(i)}\right) + \left(1 - b_{u,j}^{(i)}\right) \log\left(1 - b_{u,j}^{(i)}\right) \right)$$

where $p_{u,j}^{(i)}$ is the probability that the $j^{th}$ bit sent by the $u^{th}$ transmitter is set to one for the $i^{th}$ training example. The loss function L operates on bits. Hence, the training of the present method may be used to train a system in which both the demodulator and the demapper are implemented by a single component or implemented by separate components. Other loss functions such as the categorical cross-entropy may be used in step 605 for enabling a detection on symbols.

In response to determining (inquiry step 607) that a predefined stop criterion is not met, steps 603 to 607 may be repeated, otherwise the last values of the trainable ψ parameters may be provided. The stop criterion may for example require that a predefined number of iterations is reached. In another example, the stop criterion may require that the loss function has not decreased for a predefined number of iterations.

The training of the method of FIG. 6 may be optimized using optimization parameters. The optimization parameters may for example comprise the learning rate, batch size, and other parameters of the SGD variant (e.g. Adam or RMSProp). Also, other training methods may be used to train the ML model 210. These other training methods may for example comprise evolutionary-based approaches and may use the same loss function L(ψ).

FIG. 7 is a flowchart of a method for training an algorithm with trainable parameters such as the ML model 210 in accordance with an example of the present subject matter. FIG. 7 will be discussed with regard to the deployment scenario shown in FIG. 2 for example purposes. However, example embodiments should not be limited to this example.

Assuming, for example, that a differentiable model of the channel 208 is available, the end-to-end system e.g. 200, made of the transmitters, channel model, and receiver may be trained using the following procedure.

The training set may comprise entries $\{(H^{(1)}, b_1^{(1)}, \ldots, b_U^{(1)})\}_{i=1,\ldots,D}$ of size D, in which a training example consists of a channel matrix H, and the transmitted bit vectors $b_1, \ldots, b_U$.

The trainable parameters ψ and the trainable matrices $\tilde{C}_1$, $i \in \{1, \ldots, U\}$ may be initialized in step 701. The initialization may for example be performed randomly. In step 703, B training examples may be sampled from the training set. In step 705, the trainable parameters ψ and $\tilde{C}_1$, $i \in \{1, \ldots, U\}$ may be updated by applying one step of SGD on the following loss function:

$$L(\psi, C) = -\frac{1}{B} \sum_{i=1}^{B} \sum_{u=1}^{U} \sum_{j=1}^{k_u} \left( b_{i,j}^{(i)} \log\left(p_{u,j}^{(i)}\right) + \left(1 - b_{u,j}^{(i)}\right) \log\left(1 - b_{u,j}^{(i)}\right) \right)$$

where $p_{u,j}^{(1)}$ is the probability that the $j^{th}$ bit sent by the $u^{th}$ transmitter is set to one for the $i^{th}$ training example. In response to determining (inquiry step 707) that the predefined stop criterion is not met, steps 703 to 707 may be repeated, otherwise the last values of the trainable parameters ψ and $\tilde{C}_1$, $i \in \{1, \ldots, U\}$ may be provided. Other loss functions such as the categorical cross-entropy may be used in step 705 for enabling a detection on symbols.

FIG. 8A is a block diagram of an example implementation of the demodulator 205 described with reference to FIG. 2. In the example implementation shown in FIG. 8A, the demodulator 205 is implemented using a deep feedforward neural network 800A comprising a number of dense layers 802A and an input layer 801A. The input layer 801A is a $\mathbb{C}2\mathbb{R}$ layer that converts N complex numbers into 2N real numbers. The number of dense layers may be the number of parameters of the set of settable parameters θ e.g. each parameter of the set of settable parameters θ may be associated with a respective dense layer of the deep feedforward neural network 800A. Three dense layers are shown in FIG. 8A by way of example only.

The set of settable parameters θ may be weights of the dense layers of the deep feedforward neural network 800A. The deep feedforward neural network 800A implements the mapping $f_\theta: y \in \mathbb{C}^N \mapsto S \in \mathbb{R}^{\sum_{i=1}^{U} 2^{k_i}}$ where $\theta \in \mathbb{R}^K$ is the set of settable parameters of dimension K=3. For example, the deep feedforward neural network 800A maps an N-dimensional complex-valued vector y that forms the received symbols to probabilities S over the transmitted symbols x. The deep feedforward neural network 800A is provided for exemplification purpose and other implementations of the demodulator 205, including other neural network implementations, are possible.

FIG. 8B is a block diagram of an example implementation of the algorithm 110 or ML model 210 described with reference to FIG. 1 and FIG. 2 respectively. In the example implementation shown in FIG. 8B, the algorithm 100 is implemented using a deep feedforward neural network 800B comprising a number of dense layers 802B and an input layer 801B. The input layer 801B is a $\mathbb{C}2\mathbb{R}$ layer that converts N complex numbers into 2N real numbers. The number of dense layers may, for example, be user defined. Three dense layers are shown in FIG. 8B by way of example only. The deep feedforward neural network 800B implements the mapping $g_\psi: H \in \mathbb{C}^{N \times U} \mapsto \theta \in \mathbb{R}^K$ where $\psi \in \mathbb{R}^L$ is the set of trainable parameters of the deep feedforward neural network 800B. For example, the deep feedforward neural network 800B maps a channel matrix H to values of the set of settable parameters θ. The deep feedforward neural network 800B is provided for exemplification purpose and other implementations of the algorithm 110, including other neural network implementations, are possible.

Figure 9:
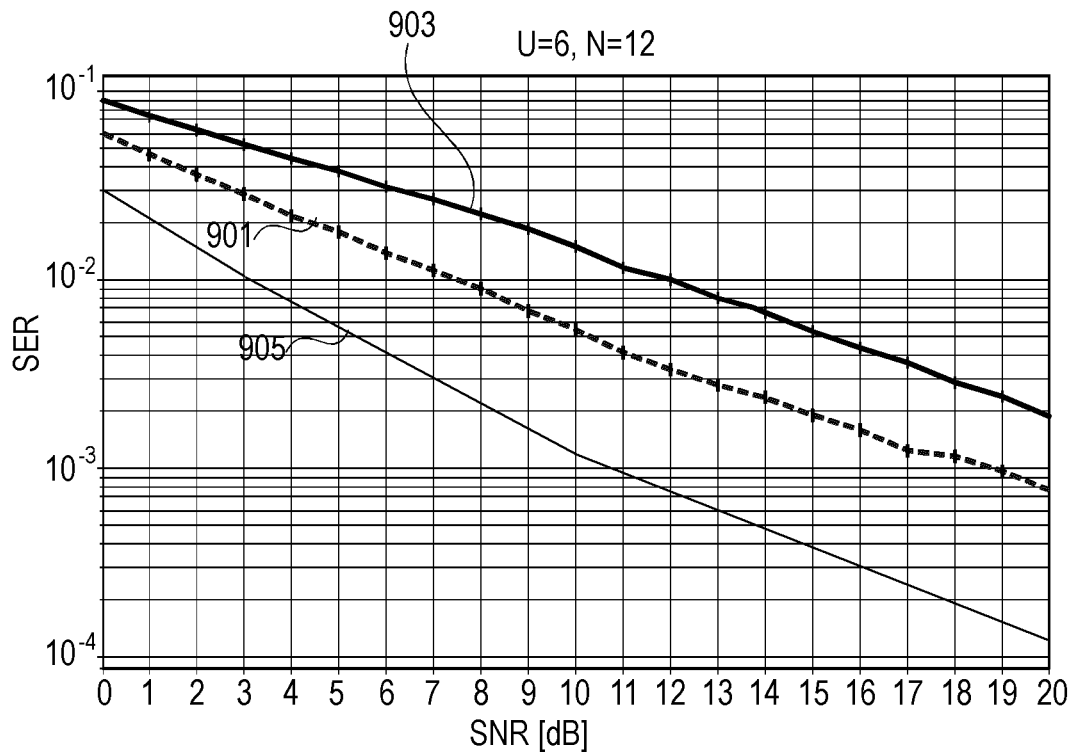
FIG. 9 showing the variation of the symbol error rate (SER) for different signal-to-noise ratio (SNR) values.

FIG. 9 is a graph showing the variation of the symbol error rate (SER) for different SNR values using the present subject matter 901 and using a LMMSE estimator 903 and a maximum likelihood detector 905. The graph is obtained using simulation data. The simulation data are generated using a communication system such as the system of FIG. 2 with the number of transmitting antennas U=6 and the number of receiving antennas N=12. The demodulator 205 is implemented by the MMNet. The MMNet may require only 100 settable parameters. Such a low number of settable parameters leads to a ML model 210 of low complexity. Instead of retraining the MMNet for each realization of the channel matrix H to achieve good performance, the present subject matter may generate the values of the settable parameters for each realization using the trained ML model 210. As shown in FIG. 9, the achieved SER with present subject matter may outperform the LMMSE baseline. The achieved SER shows that the present subject matter may significantly reduce the gap with the maximum likelihood detector while being less complex compared to the maximum likelihood detector. The maximum likelihood detector may be too complex to be practical on most systems.

Figure 10:
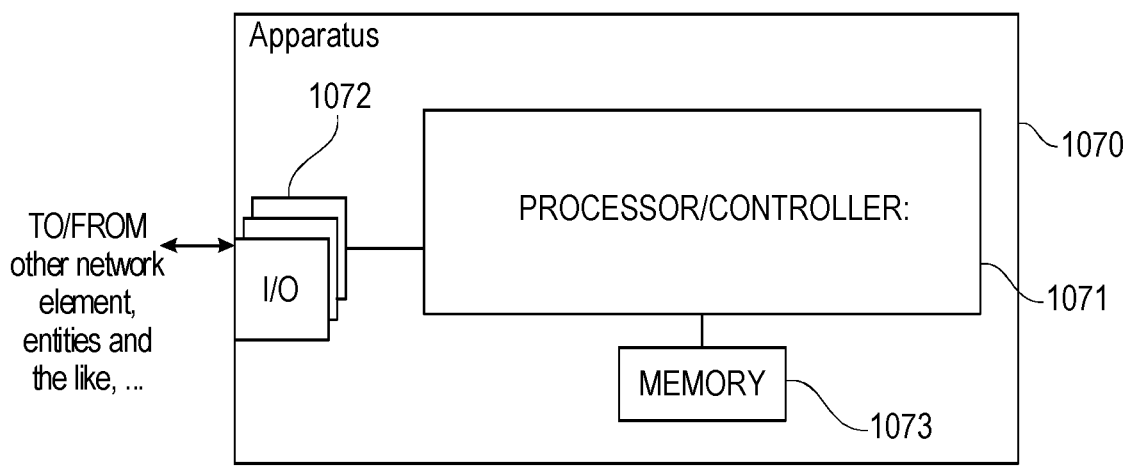
FIG. 10 is a block diagram showing an example of an apparatus according to an example of the present subject matter.

In FIG. 10, a block circuit diagram illustrating a configuration of an apparatus 1070 is shown, which is configured to implement at least part of the present subject matter. It is to be noted that the apparatus 1070 shown in FIG. 10 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus, or the like. The apparatus 1070 may comprise a processing function or processor 1071, such as a CPU or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements, or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIGS. 3, 4, 5, 6 and 7.

For example, the processor 1071 is configured for inputting information indicative of a state of a communication channel to an algorithm e.g. 110, and receiving from the algorithm values of a set of settable parameters of a detector. The processor 1071 is further configured for inputting a received signal and the values of the set of settable parameters to the detector for receiving from the detector an output indicative of a message transmitted to a receiver.

The invention claimed is:

1. A receiver comprising:
   a detector configured for receiving a signal from at least one transmitter, the detector comprising a set of one or more settable parameters; and
   circuitry comprising at least one processor and at least one memory including computer program code provided with an algorithm having trainable parameters, the algorithm being configured to receive as input information indicative of a status of a communication channel between the at least one transmitter and the receiver and to output values of the set of settable parameters of the detector, the detector being configured to receive a signal corresponding to a message sent with the at least one transmitter and to provide an output indicative of the message based on the received signal and the output values of the set of settable parameters of the detector;
   wherein the set of settable parameters of the detector is divided into a number of vectors of a first dimension, wherein the algorithm having trainable parameters is configured to output an equal number of embedding vectors of a second dimension, the second dimension being smaller than the first dimension, wherein the algorithm is configured to generate the values for the settable parameters from the embedding vectors using a trainable matrix having a dimension comprising the first dimension and the second dimension.

2. The receiver of claim 1, wherein the detector is configured to implement an iterative message recovery algorithm or a neural network.

3. The receiver of claim 2, wherein the values of the set of one or more settable parameters are shared between iterations of the iterative message recovery algorithm.

4. The receiver of claim 2, the iterative message recovery algorithm being any one of: an orthogonal approximate message passing network or a deep learning multiple-input and multiple-output detection scheme.

5. The receiver of claim 1, the algorithm having trainable parameters being a trained machine learning model.

6. The receiver of claim 1, the receiver comprising multiple receiving antennas, wherein the information indicative of the status of the communication channel is an estimate of a multiple-input and multiple-output channel matrix.

7. The receiver of claim 6, the detector comprising a demodulator and a demapper, the demodulator being configured to provide a probability that a modulated symbol of the message is transmitted from a particular transmitting antenna of multiple transmitting antennas given the received signal; the demapper being configured to provide a probability that each bit of the modulated symbol is set to one with a particular transmitting antenna of the multiple transmitting antennas, wherein the provided output comprises any one anyone of the two probabilities.

8. The receiver of claim 1, the algorithm having trainable parameters being a neural network.

9. A method comprising:
providing an algorithm having trainable parameters that is configured to receive as input information indicative of a status of a communication channel between at least one transmitter and a receiver and to output values of a set of one or more settable parameters of a detector,
receiving a signal at the receiver,
in response to inputting the information to the algorithm, receiving from the algorithm values of the set of settable parameters, and
inputting the received signal and the values of the set of settable parameters to the detector for receiving an output indicative of a message transmitted to the receiver;
wherein the set of settable parameters of the detector is divided into a number of vectors of a first dimension, wherein the algorithm having trainable parameters is configured to output an equal number of embedding vectors of a second dimension, the second dimension being smaller than the first dimension, wherein the algorithm is configured to generate the values for the settable parameters from the embedding vectors using a trainable matrix having a dimension comprising the first dimension and the second dimension.

10. The method of claim 9, further comprising
receiving a training set comprising triplet samples, each triplet sample comprising a channel state information, a transmitted message and a received signal;
training the algorithm using the training set and the detector, thereby generating the algorithm with values of the trainable parameters.

11. The method of claim 10, the at least one transmitter comprising multiple transmitting antennas and the receiver comprising multiple receiving antennas, the message comprising multiple bit vectors each being transmitted with a respective transmitting antenna of the multiple transmitting antennas, the training being performed to obtain values of the trainable parameters with optimizing a predefined loss function, the loss function being a binary cross entropy on transmitted bits or a categorical cross entropy on symbols.

12. The method of claim 11, the training further providing values of trainable matrices representing constellations of the at least one transmitter, thereby enabling a joint optimization of the receiver and the at least one transmitter.

13. The method of claim 9, the detector is configured to implement an iterative message recovery algorithm, the values of the set of settable parameters being shared between iterations of the algorithm.

14. A computer program product comprising a non-transitory memory encoded with instructions stored thereon configured for causing an apparatus to perform at least the following:
providing an algorithm having trainable parameters that is configured to receive as input information indicative of a status of a communication channel between at least one transmitter and the apparatus and to output values of a set of one or more settable parameters of a detector of the apparatus,
receiving a signal at the apparatus,
in response to inputting the information to the algorithm, receiving from the algorithm values of the set of settable parameters, and
inputting the received signal and the values of the set of settable parameters to the detector for receiving an output indicative of a message transmitted to the apparatus;
wherein the set of settable parameters of the detector is divided into a number of vectors of a first dimension, wherein the algorithm having trainable parameters is configured to output an equal number of embedding vectors of a second dimension, the second dimension being smaller than the first dimension, wherein the algorithm is configured to generate the values for the settable parameters from the embedding vectors using a trainable matrix having a dimension comprising the first dimension and the second dimension.

15. An apparatus comprising a receiver and at least one transmitter, the receiver comprising:
a detector configured for receiving a signal from the at least one transmitter, the detector comprising a set of one or more settable parameters, and
circuitry comprising at least one processor and at least one memory including an algorithm having trainable parameters, the algorithm being configured to receive as input information indicative of a status of a communication channel between the at least one transmitter and the receiver and to output values of the set of settable parameters of the detector, the detector being configured to receive a signal corresponding to a message sent with the at least one transmitter and to provide an output indicative of the message based on the received signal and the output values of the set of settable parameters of the detector;
wherein the set of settable parameters of the detector is divided into a number of vectors of a first dimension, wherein the algorithm having trainable parameters is configured to output an equal number of embedding vectors of a second dimension, the second dimension being smaller than the first dimension, wherein the algorithm is configured to generate the values for the settable parameters from the embedding vectors using a trainable matrix having a dimension comprising the first dimension and the second dimension.

16. The apparatus of claim 15, the receiver comprising multiple receiving antennas, the at least one transmitter being one of: one transmitter having multiple transmitting antennas or multiple transmitters each having a transmitting antenna, wherein the information indicative of the status of the communication channel is a multiple-input and multiple-output channel matrix.

17. A receiver comprising:
a detector configured for receiving a signal from at least one transmitter, the detector comprising a set of one or more settable parameters; and circuitry comprising at least one processor and at least one memory including computer program code provided with an algorithm having trainable parameters, the algorithm being configured to receive as input information indicative of a status of a communication channel between the at least one transmitter and the receiver and to output values of the set of settable parameters of the detector, the detector being configured to receive a signal corresponding to a message sent with the at least one transmitter and to provide an output indicative of the message based on the received signal and the output values of the set of settable parameters of the detector;

wherein the receiver comprises multiple receiving antennas, wherein the information indicative of the status of the communication channel is an estimate of a multiple-input and multiple-output channel matrix;

wherein the detector comprises a demodulator and a demapper, the demodulator being configured to provide a probability that a modulated symbol of the message is transmitted from a particular transmitting antenna of multiple transmitting antennas given the received signal, and the demapper being configured to provide a probability that each bit of the modulated symbol is set to one with a particular transmitting antenna of the multiple transmitting antennas, wherein the provided output comprises any one of the two probabilities.

18. An apparatus comprising at least one processor, and at least one memory storing instructions that, when executed by the at least one processor, cause the apparatus at least to:

provide an algorithm having trainable parameters that is configured to receive as input information indicative of a status of a communication channel between at least one transmitter and the apparatus and to output values of a set of one or more settable parameters of a detector of the apparatus, receive a signal at the apparatus, in response to inputting the information to the algorithm, receive from the algorithm values of the set of settable parameters, and input the received signal and the values of the set of settable parameters to the detector for receiving an output indicative of a message transmitted to the apparatus;

wherein the apparatus comprises multiple receiving antennas, wherein the information indicative of the status of the communication channel is an estimate of a multiple-input and multiple-output channel matrix;

wherein the detector comprises a demodulator and a demapper, the demodulator being configured to provide a probability that a modulated symbol of the message is transmitted from a particular transmitting antenna of multiple transmitting antennas given the received signal, and the demapper being configured to provide a probability that each bit of the modulated symbol is set to one with a particular transmitting antenna of the multiple transmitting antennas, wherein the provided output comprises any one of the two probabilities.

* * * * *

UNITED STATES PATENT AND TRADEMARK OFFICE
CERTIFICATE OF CORRECTION

PATENT NO. : 12,040,857 B2
APPLICATION NO. : 17/795620
DATED : July 16, 2024
INVENTOR(S) : Faycal Ait Aoudia, Mathieu Goutay and Jakob Hoydis It is certified that error appears in the above-identified patent and that said Letters Patent is hereby corrected as shown below:

In the Claims

In Claim 7, Column 15, Line 15, delete "anyone".

Signed and Sealed this
Third Day of September, 2024

Katherine Kelly Vidal
*Director of the United States Patent and Trademark Office*